UNITED STATES PATENT OFFICE.

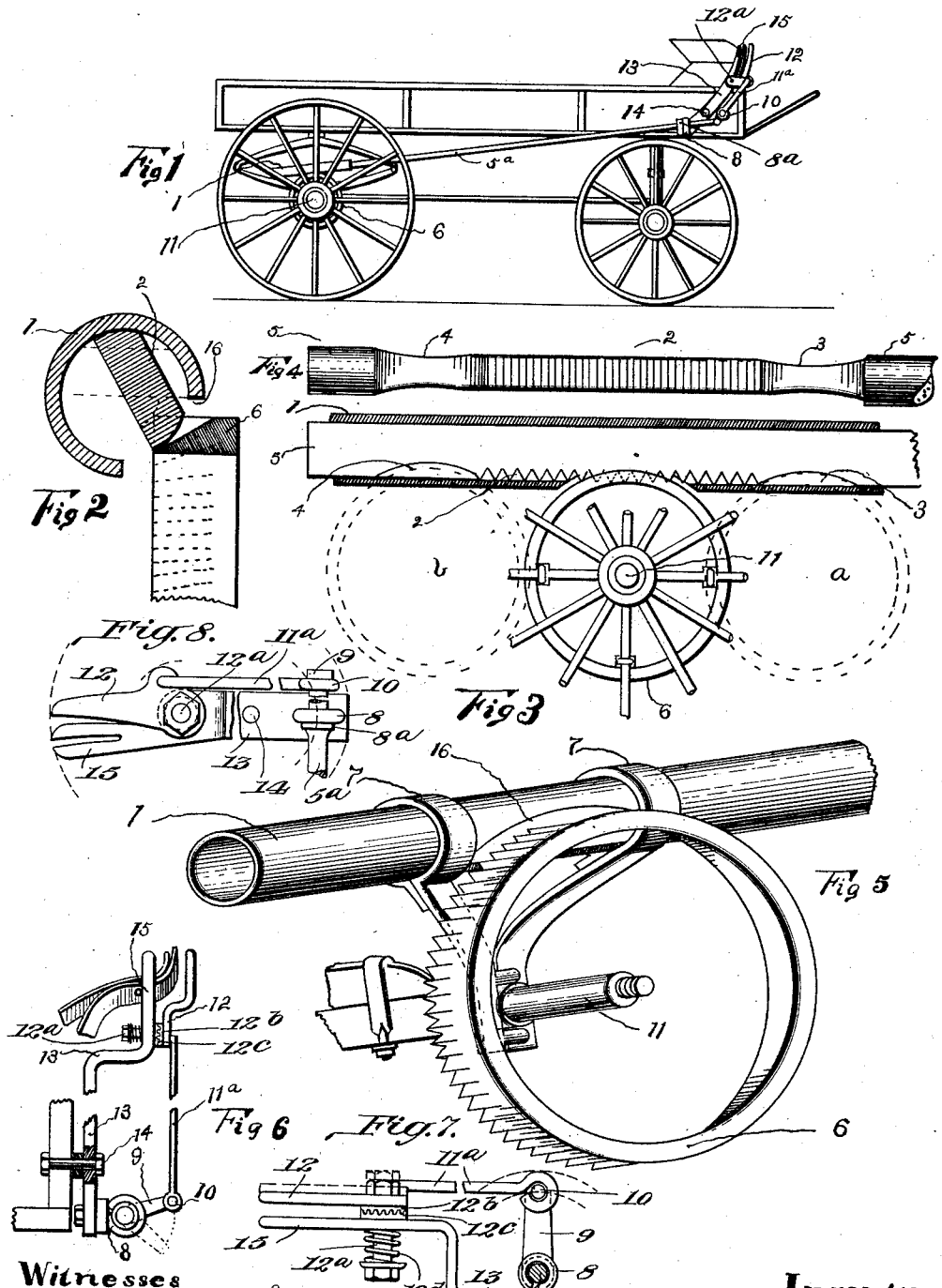

DAVID ABRAM CALLAWAY, OF PUEBLO, COLORADO, ASSIGNOR OF ONE-THIRD TO LYMAN I. HENRY AND ONE-THIRD TO H. G. DE TIENNE, BOTH OF PUEBLO, COLORADO.

AUTOMATIC HITCHING DEVICE.

1,044,136. Specification of Letters Patent. Patented Nov. 12, 1912.

Application filed June 9, 1909. Serial No. 501,155.

*To all whom it may concern:*

Be it known that I, DAVID ABRAM CALLAWAY, a citizen of the United States, residing at No. 6 Terrace View, Pueblo, Colorado, have invented certain new and useful Improvements in Automatic Hitching Devices, of which the following is a specification.

My invention relates to automatic hitching devices for use on a vehicle drawn by horses, so that the horses may be readily hitched, and the objects of my invention are; first, to provide a means of hitching horses so that any forward movement will tighten the reins, and any movement backward will release the reins; second, to avoid the use of cords and extra lines; third, to provide a compact device; and fourth, to provide a device readily attachable to different vehicles. I attain these objects by the mechanisms illustrated in the accompanying drawings, in which,—

Figure 1 is a side elevation view of a vehicle with my device attached; Fig. 2 is a cross sectional view showing the toothed band and rack in engagement; Fig. 3 is a side elevation view of the rack and toothed band in operative relation as attached to an axle and wheel, with the containing guide in longitudinal section; Fig. 4 is a plan view of that part of the engaging bar operating on the toothed band; Fig. 5 is a perspective view of the containing guide and attachment to the axle, with the toothed band in relative position; Fig. 6 is a vertical cross sectional view of the box of the vehicle showing the end of the operating bar at its connection with the holding and engaging levers; Fig. 7 is a rear view of the engaging lever and holding lever showing the holding means; and Fig. 8 is a side view of the engaging and holding levers showing the movements and their relation to the actuating means.

Similar numerals refer to similar parts throughout the several views.

The band 6 is provided with teeth on the exterior, and is rigidly attached concentrically on the inner side of one of the rear wheels of the vehicles to the spokes of the wheel by clip means, or it may be attached on the inner end of the hub of the wheel. The containing guide 1 is in form similar to a pipe and is attached to the rear axle 11 of the vehicle, by clip means 7. A slot 16 is cut in the guide piece 1 and the adjustment is such that said slot permits a portion of the toothed band 6 to run therein. The engaging bar 5 is constructed with rounded ends closely fitting the interior of the containing guide 1, and between said ends is the rack portion 2, the teeth of which fit the teeth in said band 6. At each end of the rack 2 of said engaging bar are clearance spaces 3 and 4 in the form of arcs. One end of the engaging bar 5 is extended toward the front of the vehicle as $5^a$, and is connected pivotally by eye-bolt means 8 to the short end of the holding lever 13, and said bar $5^a$ is provided with a collar means $8^a$ to prevent the same from slipping through the eye-bolt, which lever 13 is pivotally attached to the body of the vehicle at 14. The top of this lever 13 is provided with means 15 having a slot for holding the reins. The rod $5^a$ extends beyond the lever 13 and is provided with the crank 9. To this crank 9 is attached pivotally at 10 the rod $11^a$, and the upper end of the rod is attached to the short arm of engaging lever 12. The engaging lever 12 is pivotally attached by bolt $12^a$ to and near the top of holding lever 13, and lever 12 is provided with any well known holding means to retain it in position set by operator. In the illustration I have shown a commonly used ratchet being a toothed boss $12^c$ attached to the lever 13, and a toothed boss $12^b$ attached to the lever 12, held by loose bolt means $12^a$ provided with spring means $12^d$.

The device being attached to a vehicle the driver drops the reins that are provided with a knot or means to prevent slipping through the slot in 15 into the rein-holding portion 15 of lever 13, and he turns the engaging lever 12, which through the crank 9 turns the rod $5^a$ and brings the rack 2 on the engaging bar 5 in the interior of containing guide 1 into engagement with the teeth of said band 6, by causing the rack 2 to change from the position shown in dotted lines in Fig. 2 to the position of engagement as shown in last said Fig. 2. As the engaging lever 12 is provided with means for retaining it in position when placed, the teeth of rack 2 will, in above described position, be held in engagement with the teeth of the band 6; and if the team moves forward the rein-holding top 15 of the lever 13 pulls back on the reins thereby holding the horses; and if the horses should move backward the engaging bar 5 moves backward, the lever 13 moves forward and the pull on the reins is released. The device is so adjusted that sufficient movement is given to pull back on the reins for all usual purposes and the space 4 permits, on extreme movement forward of the horses, the toothed band 6 to hold the engaging bar forward as it assumes the position as shown in dotted lines "b" in Fig. 3. If the horses should back the vehicle in extreme movement, in order to avoid any breaking strain on the mechanism, the space 3 is placed at the front end of the toothed rack 2 so that the toothed band 6 will assume the position shown by dotted lines "a" in Fig. 3. When disengagement of the rack 2 with the toothed band 6 is desired the engaging lever 12 is operated and the engaging bar 5 is turned back and away from the toothed band 6 in the containing guide 1, out of engagement, and is so held by retaining means on the lever 12. It is readily seen that the containing guide and toothed rack may be placed beneath the axle and the rod $5^a$ connected to the rein-holding lever 13 between the rein-holding slot therein and the attachment thereof to the body of the vehicle, and the same results would be obtained.

I claim:—

1. In an automatic hitching device of the character described, in connection with a vehicle to be drawn by horses, the combination of a rein-holding lever attached to the body of the vehicle, a rod connected rotatably with said lever carrying crank means, an engaging lever attached operatively on said holding lever connected by rod means with said crank means, and a toothed rack integral with the said rod means adapted to operate in said holding lever, a containing guide carrying said rack attached to the rear axle having an opening in the side, a toothed band on the inner side of rear wheel adjacent to said guide attached concentrically with the hub of said wheel and turnable with said wheel, all substantially as set forth.

2. In an automatic hitching device of the character described attached to a horse vehicle provided with a rein-holding lever carrying an engaging lever, a toothed band attached concentrically with the hub on the inner side of and turnable with a rear wheel of said vehicle, a slotted containing guide, a toothed rack carried in said containing guide and connected by rod means with said holding and engaging levers, all substantially as set forth.

3. In an automatic hitching device of the character described, an engaging bar having guide ends, a rack between said guide ends, a clearance space at each end of said rack, a cylindrical containing guide carrying said engaging bar and provided with an open space centrally disposed attached to a rear axle of a vehicle, a toothed band concentric with the hub of a rear wheel attached and turnable with the rear wheel disposed operatively as to said containing guide, all substantially as set forth.

DAVID ABRAM CALLAWAY.

Witnesses:
 MAUDE S. ENGLE,
 CASSIUS M. WALKER.

---

Copies of this patent may be obtained for five cents each, by addressing the "Commissioner of Patents, Washington, D. C."